United States Patent [19]
Iidaka et al.

[11] Patent Number: 5,528,590
[45] Date of Patent: Jun. 18, 1996

[54] ATM-UNI-LAN COMMUNICATION METHOD AND APPARATUS

[75] Inventors: Eiji Iidaka; Kazuhiko Ito; Haruo Moritomo, all of Kawasaki, Japan

[73] Assignee: Fujitsu Limited, Kanagawa, Japan

[21] Appl. No.: 344,545

[22] Filed: Nov. 23, 1994

[30] Foreign Application Priority Data

May 11, 1994 [JP] Japan .................................. 6-097293

[51] Int. Cl.⁶ .................................................... H04L 12/66
[52] U.S. Cl. ......................... 370/60.1; 370/61; 370/82
[58] Field of Search ........................... 370/60, 60.1, 79, 370/82, 84, 94.1, 94.2, 14, 54, 61, 105.1

[56] References Cited

U.S. PATENT DOCUMENTS

| | | | |
|---|---|---|---|
| 5,315,586 | 5/1994 | Charvillat | 370/61 X |
| 5,315,588 | 5/1994 | Kajiwara et al. | 370/94.2 X |
| 5,341,376 | 8/1994 | Yamashita | 370/94.2 X |

FOREIGN PATENT DOCUMENTS

| | | |
|---|---|---|
| 3231547 | 10/1991 | Japan . |
| 413331 | 1/1992 | Japan . |
| 4249447 | 9/1992 | Japan . |

*Primary Examiner*—Melvin Marcelo

[57] ABSTRACT

In a method of communicating between an ATM-UNI and a LAN in a communication apparatus, which has an ATM-UNI interface and a LAN interface for performing communication between these interfaces via an ATM switch, transmission data in an ATM-cell format is received from a terminal connected to the ATM-UNI interface to a terminal connected to the LAN interface. The ATM cells are accumulated in a buffer memory provided in the ATM-UNI interface and assembled into a frame. Completion of reception of all ATM cells of one frame is recognized and it is determined whether there is margin for a transmission by referring to a status of vacancy of a LAN interface corresponding to the other party to communication. One frame of the ATM cells accumulated in the buffer memory is transferred to the LAN interface corresponding to the other party via the ATM switch in a case where there is margin for transmission. The ATM cells are converted into a frame at this LAN interface and the frame is sent to a LAN terminal.

12 Claims, 12 Drawing Sheets

| LAN INTERFACE | MAXIMUM ALLOWA-BLE BAND Fmax | BAND USED F | SURPLUS BAND Fo |
|---|---|---|---|
| | | | |
| | | | |
| ⋮ | ⋮ | ⋮ | ⋮ |

ATM-UNI-LAN COMMUNICATION METHOD AND APPARATUS

BACKGROUND OF THE INVENTION

This invention relates to a communication apparatus having an ATM-UNI (asynchronous transfer mode—user network interface) and a LAN (local area network) interface for communication between these interfaces via an ATM switch. The invention relates also to a method of communicating between an ATM-UNI and a LAN.

Progress has recently been made in the development of broad exchanges and broad switching techniques and construction of a communication network consolidating LANs is envisioned for the future. At the present time, mutual communication between terminals accommodated by ATM-UNIs is being implemented point-to-point using a PVC (permanent virtual channel). However, there is demand for communication between terminals accommodated by ATM-UNIs and terminals accommodated by FDDIs (fiber distributed data interfaces) or existing LANs such as Ethernets.

In a communication connection, it is necessary to investigate whether the other party is presently communicating as well as the band vacancy (the margin of the band necessary for a transmission). In communication between an ATM-UNI interface and a LAN interface, the method of checking the status of communication of the other party's interface is as follows:

(1) Data transmission from LAN side to ATM-UNI

When a data frame arrives from a LAN terminal, the source of the transmission is analyzed and a controller (processor) within the communication apparatus is requested for a connection. The connection request serves as a trigger in response to which the controller checks the status of communication of the ATM-UNI on the side of the other party.

(2) Data transmission from ATM-UNI side to LAN side

In a data transmission from an SVC (switched virtual channel), it is necessary to establish a connection for every call. To this end, a call set-up request is applied to the controller within the communication apparatus at the start of communication from an SVC-connected terminal. The controller responds to this request by checking for vacancy on the LAN side. If there is a vacancy necessary for transmission, an ATM cell which has entered from the ATM-UNI terminal is converted to a frame and the frame is transmitted. If the required vacancy is lacking, however, either the data transmission is refused or a vacancy is awaited. The ATM-UNI terminal is so notified.

In communication on a LAN, data is not flowing at all times. Rather, as shown in (a) of FIG. 13, data is transferred by being placed in an information field of a frame only when the necessary data has been generated. (This is bursty transmission). When a connection having a peak speed of $F_0/3$ is established in such a bursty transmission, conventionally a band $F_0/3$ is allocated to the LAN interface, as shown in (b) of FIG. 13, even when a frame is not being transmitted during the set-up of the connection. Consequently, when n-number of connections are established, as shown in (c) of FIG. 13, the band used becomes $n.F_0/3$, as shown in (d) of FIG. 13, even though the frame transmission times do not overlap.

As a consequence of the foregoing, a problem with the prior art is that connections in excess of $n \geq 4$ cannot be established even if the frame transmission times do not overlap and the actual band used is $F_0/3$, as shown in (e) of FIG. 13, where $F_0$ is the maximum allowable band of the LAN interface.

Accordingly, in a case where data is transmitted from an ATM-UNI to a LAN, it is necessary to be aware of the frame serving as the trigger for checking the status of communication. In other words, if the band used is managed by acquiring and releasing the band of the LAN whenever transfer of a frame begins and ends, then the band of the LAN interface can be used efficiently and it will be possible to reduce waiting time and occurrence of transmission refusal.

SUMMARY OF THE INVENTION

Accordingly, a first object of the present invention is to make effective utilization of a band by checking the status of vacancy (band margin) of a LAN interface of a party to communication.

A second object of the present invention is to make effective utilization of a band by updating the used band of a LAN interface whenever a frame transfer begins and ends.

A third object of the present invention is to reduce waiting time and occurrence of transmission refusal by making it possible to use the band of a LAN interface efficiently.

In accordance with the present invention, the foregoing objects are attained by providing a method of communicating between an ATM-UNI and a LAN in a communication apparatus having an ATM-UNI interface and a LAN interface for performing communication between these interfaces via an ATM switch, the method comprising the steps of receiving, in an ATM-cell format, transmission data from a terminal connected to the ATM-UNI interface to a terminal connected to the LAN interface, accumulating the ATM cells in a buffer memory provided in the ATM-UNI interface and assembling the ATM cells into a frame, recognizing completion of reception of all ATM cells of one frame, determining whether there is margin for a transmission by referring to status of vacancy of a LAN interface corresponding to the other party to communication, transferring one frame of the ATM cells accumulated in the buffer memory to the LAN interface corresponding to the other party via the ATM switch in a case where there is margin for transmission, and converting the ATM cells into a frame at this LAN interface and sending the frame to a LAN terminal. A communication apparatus having these functions also satisfies the foregoing objects.

Further, in accordance with the present invention, the foregoing objects are attained by providing a method of communicating between an ATM-UNI and a LAN in a communication apparatus having an ATM-UNI interface and a LAN interface for performing communication between these interfaces via an ATM switch, the method comprising the steps of receiving, in an ATM-cell format, transmission data from a terminal connected to the ATM-UNI interface to a terminal connected to the LAN interface, accumulating the ATM cells in a buffer memory provided in the ATM-UNI interface and assembling the ATM cells into a frame, recognizing completion of reception of all ATM cells of one frame, determining whether vacancy of a band f, which is required for transfer of the frame accumulated in the buffer memory, exists in the LAN interface, if the vacancy exists, increasing the band used by f or decreasing a surplus band by f and, in addition, transferring one frame of the ATM cells accumulated in the buffer memory to the LAN interface via the ATM switch, converting the ATM cells into a frame at this LAN interface and sending the frame to a LAN terminal, and decreasing the band used by f or increasing a surplus band by f in response to completion of transfer of the frame. A communication apparatus having these functions also satisfies the foregoing objects.

Other features and advantages of the present invention will be apparent from the following description taken in conjunction with the accompanying drawings.

DESCRIPTION OF THE PREFERRED EMBODIMENTS (A) Overview of the invention

Figure 1:
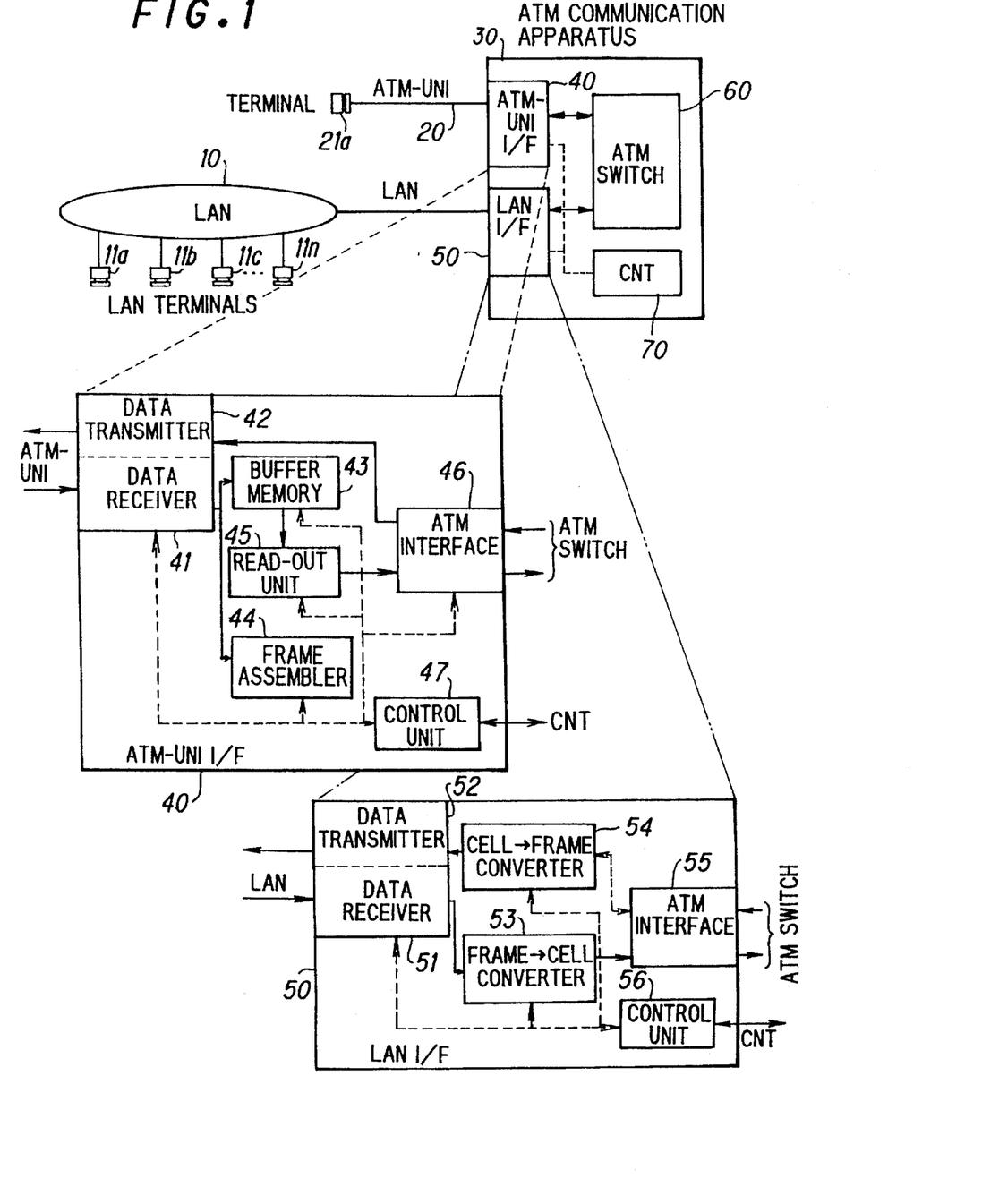
FIG. 1 is a diagram for describing an overview of the present invention.

FIG. 1 is a diagram for describing an overview of the present invention.

As shown in FIG. 1, a LAN 10 has LAN terminals 11a–11n, and an ATM-UNI 20 is connected to an ATM terminal 21a and an ATM communication apparatus 30. The latter includes an ATM-UNI interface 40, a LAN interface 50, an ATM switch 60 and a controller (CNT) 70 for controlling the overall ATM communication apparatus.

The ATM-UNI interface 40 includes a data receiver 41 for receiving ATM cells, a data transmitter 42 for transmitting ATM cells, a buffer memory 43 for accumulating ATM cells, a frame assembler 44 for assembling ATM cells into a frame, a read-out unit 45 for reading ATM cells out of the buffer memory 43 in succession, an ATM interface 46 for sending ATM cells to the ATM 60 switch and accepting ATM cells from the ATM switch 60, and a control unit 47.

The LAN interface 50 includes a data receiver 51 for receiving frames from the LAN 10, a data transmitter 52 for transmitting frames to the LAN 10, a first converter 53 for converting a frame to ATM cells, a second converter 54 for converting ATM cells to a frame, an ATM interface 55 for sending ATM cells to the ATM switch 60 and accepting ATM cells from the ATM switch 60, and a control unit 56.

The buffer memory 43 accumulates transmission data (ATM cells) sent from the ATM terminal 21a to the LAN terminals 11a–11n, and the frame assembler 44 assembles the ATM cells into a frame. Upon arrival of an ATM cell which indicates the beginning of a frame, the control unit 47 makes an inquiry of the controller (CNT) 70 with regard to the status of vacancy of the LAN interface 50 belong to the other party to communication. If there is sufficient margin for a transmission, the control unit 47 recognizes the completion of reception of all ATM cells of one frame by detecting the end of the frame and then controls the read-out unit 45 so that one frame of ATM cells accumulated in the buffer memory 43 is transferred to the LAN interface 50 of the other party to communication via the ATM switch 60. The second converter 54 in the LAN interface 50 converts the ATM cells to a frame and sends the frame to the LAN terminal from the data transmitter 52.

If this arrangement is adopted, the status of vacancy (band margin) of the LAN interface corresponding to the other party to communication is investigated with the frame transfer serving as a trigger, thereby making it possible to utilize the band effectively. Further, after arrival of the ATM cell which indicates the beginning of a frame, reference is had to the status of vacancy of the LAN interface corresponding to the other party. In dependence upon the status of vacancy, the ATM cells that have been stored in the buffer memory are transmitted after reception of the frame is completed. As a result, time for investigating the status of vacancy of the LAN interface can be eliminated and it is possible to suppress data transmission delay.

Further, when ATM cells stop arriving in the course of a frame, the ATM cells that have been accumulated in the buffer memory 41 up to this point in time are discarded and communication is suspended. If this arrangement is adopted, abnormal behavior of the communication apparatus can be prevented.

Furthermore, by using frame transfer as a trigger, it is determined whether vacancy of a band f, which is required for transfer of the frame accumulated in the buffer memory 43, exists in the LAN interface 50. If the vacancy exists, the band used is increased by f and one frame of the ATM cells accumulated in the buffer memory is transferred to the LAN interface 50 via the ATM switch 60. The ATM cells are converted to a frame in the LAN interface 50, the frame is sent to the LAN terminal and the band used is decreased by f in response to completion of transfer of the frame. If this arrangement is adopted, the band used by the LAN interface can be updated whenever frame transfer begins and ends and, moreover, bands can be allocated frame by frame. As a result, the band of the LAN interface 50 can be used efficiently and it is also possible to reduce waiting time and occurrence of transmission refusal.

Further, if, prior to the completion of transmission of one frame of ATM cells, the next ATM cell arrives at the same address, the band continues to be held and transmission continues. If this arrangement is adopted, a higher communication efficiency can be achieved.

Figure 2:
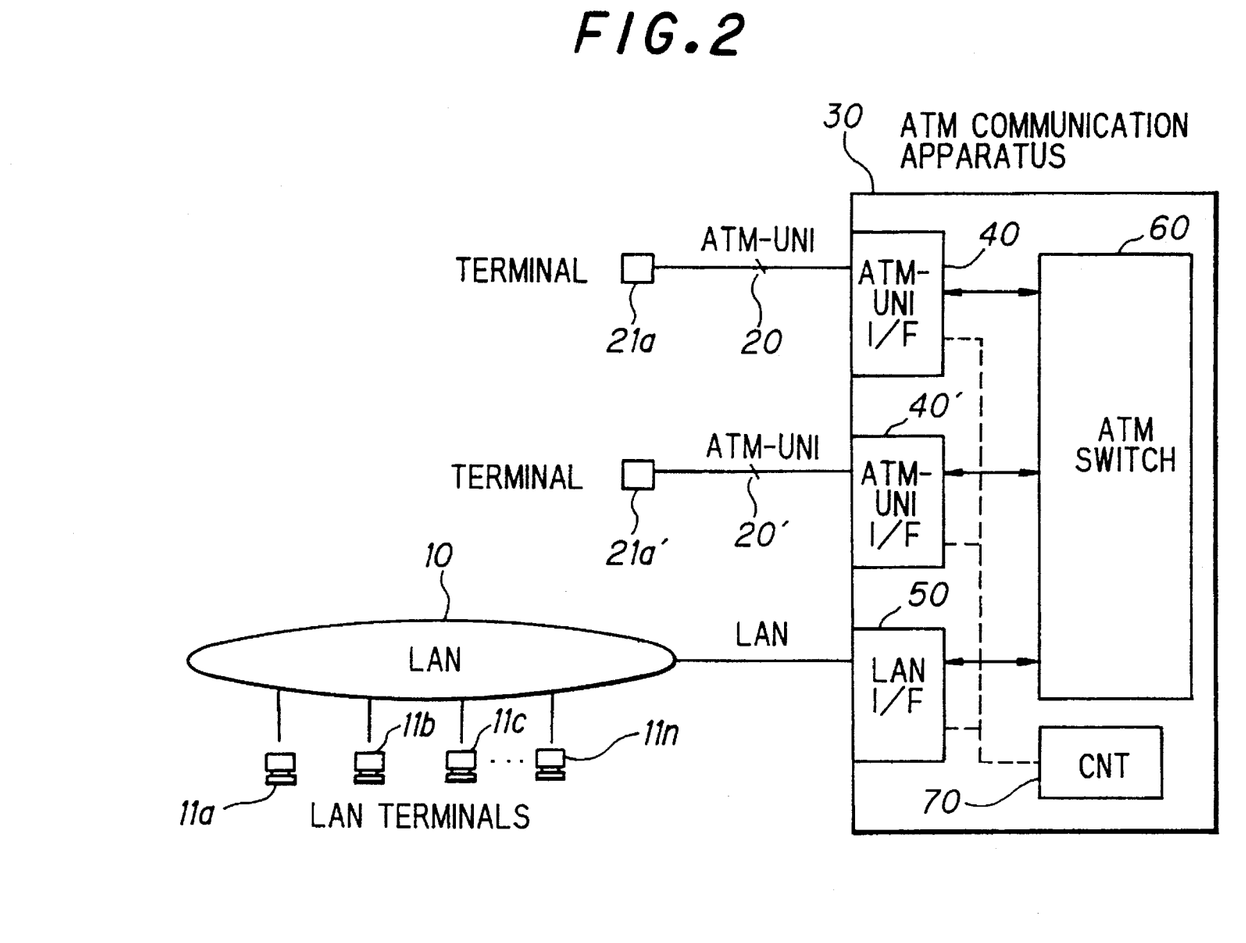
FIG. 2 is a diagram illustrating the configuration of a communication system.

(B) Embodiment of the invention (a) Configuration of communication system (a-1) Overall configuration FIG. 2 is a diagram showing the configuration of the communication system according to the present invention. The system includes the LAN 10 having the LAN terminals 11a–11n, ATM-UNIs 20, 20' connected to an ATM terminals 21a, 21a', respectively, and the ATM communication apparatus (ATM exchange) 30. The latter includes ATM-UNI interfaces 40, 40', the LAN interface 50, the ATM switch 60 and the controller (CNT) 70 for controlling the overall ATM communication apparatus. The ATM-UNI interface 40 is an interface used when the communicating party is a LAN terminal, and the ATM-UNI interface 40' is an interface used when the communicating party is an ATM terminal. It should be noted that although the ATM exchange 30 is shown to have only three interfaces, it is provided with a multiplicity of various interfaces.

(a-2) ATM-UNI interface for LAN

Figure 3:
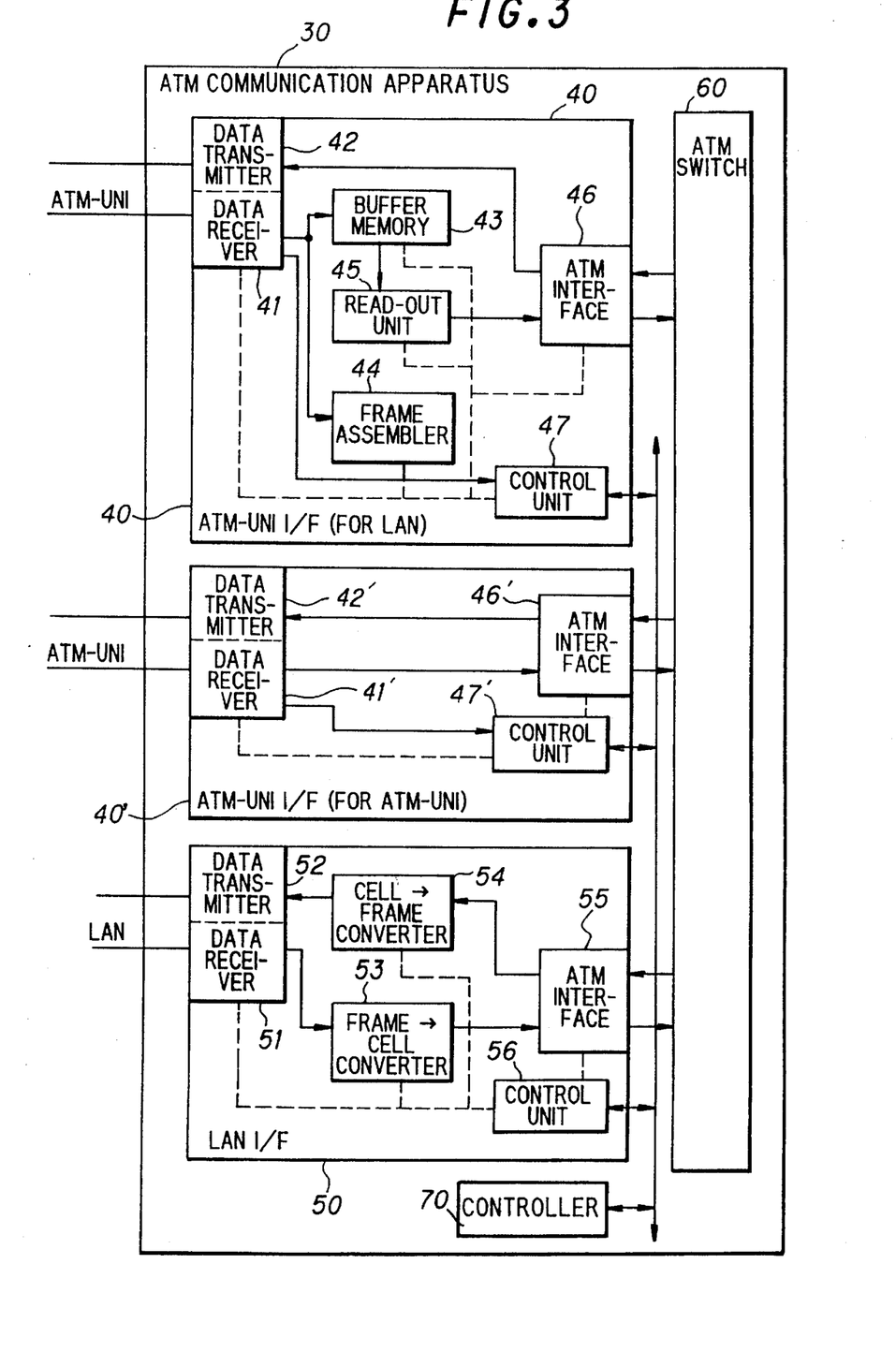
FIG. 3 is a diagram showing the construction of an ATM exchange.

FIG. 3 is a diagram showing the construction of the ATM exchange 30.

The ATM-UNI interface 40 for the LAN includes the data receiver 41 for receiving ATM cells, the data 10 transmitter 42 for transmitting ATM cells, the buffer memory 43 for accumulating ATM cells, the frame assembler 44 for assembling ATM cells into a frame, the read-out unit 45 for reading ATM cells out of the buffer memory 43 in succession, the ATM interface 46 for sending ATM cells to the ATM 60 switch and accepting ATM cells from the ATM switch 60, and the control unit 47.

The ATM interface 46 has a routing table (not shown). When an ATM cell enters, the ATM interface 46 replaces the VCI (virtual channel identifier) of the ATM cell and attaches routing information on the basis of the routing table and then sends the VCI cell to the ATM switch 60. Further, the ATM interface 46 removes routing information attached to an ATM cell which has entered from the ATM switch and then outputs this ATM cell to the data transmitter 42.

Figure 4:
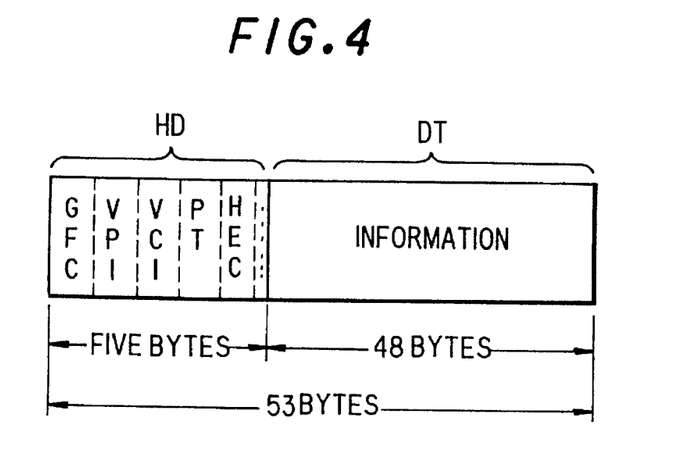
FIG. 4 is a diagram showing the constitution of an ATM cell.

FIG. 4 is a diagram showing the constitution of the ATM cell. As shown in FIG. 4, the ATM cell is composed of a fixed-length block of 53 bytes. Five of these bytes constitute a header HD and the remaining 48 bytes make up an information field DT. The header HD includes a virtual channel identifier (VCI) for call identification so that the destination will be known even after the data is separated into blocks, as well as a virtual path identifier (VPI) specifying the path, a generic flow control (GFC) used in flow control between links, payload type (PT) and header error control (HEC).

A VCI for signals is set in each ATM terminal 21a (only one of which is shown in FIG. 2) in advance. The data receiver 41 inputs an ATM cell having the signal VCI to the control unit 47 and inputs an ATM cell having a VCI for data to the buffer memory 43 and frame assembler 44. More specifically, when the ATM terminal 21a performs a call operation for calling a terminating terminal, a cell assembler within the ATM terminal partitions the originating number, the terminating number, the type of terminal, the average cell speed and the maximum cell speed (band) into cell units and attaches a signal VCI to each item of partitioned data to generate a signal cell which is then fed into the ATM exchange 30. The data receiver 41 of the ATM-UNI interface 40 inputs this signal cell to the control unit 47. As a result, the control unit 47 is capable of recognizing the cell speed (band f) necessary for frame transfer. Thereafter, the control unit 47 and controller 70 operate in association with each other to perform call processing and, in addition, decide the VPI and VCI conforming to the LAN interface of the communicating party and allocate a VCI for prescribed data to the ATM terminal 21a.

When the VCI for data enters the ATM terminal 21a, the latter partitions the data (frame; see FIG. 5) to be subsequently transmitted into cell units and attaches a header, which includes the data VCI, to each item of partitioned data to generate a data cell which is then inputted to the ATM exchange 30. The data receiver 41 of the ATM-UNI interface 40 inputs this data cell to the buffer memory 43 and frame assembler 44.

Figure 5:
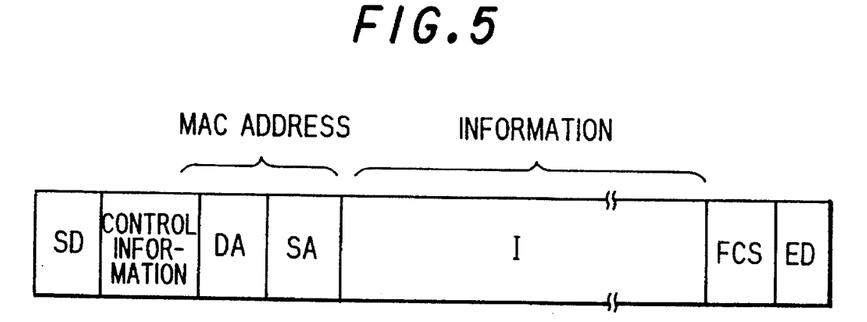
FIG. 5 is a diagram showing the constitution of a frame.

FIG. 5 is a diagram showing the basic constitution of a frame. A control field, MAC addresses (destination address DA, originating address SA) of layer 2, an information field I and a frame check sequence are placed between a start delimiter (SD) and an end delimiter (ED).

The frame assembler 44 extracts the information field DT of the ATM cells and assembles a frame.

(a-3) ATM-UNI interface for ATM-UNI

The ATM-UNI interface 40' for the ATM-UNI includes a data receiver 41' for receiving ATM cells, a data transmitter 42' for transmitting ATM cells, an ATM interface 46' and a control unit 47'. The ATM-UNI interface 40' differs from the ATM-UNI interface 40 in that it does not possess a buffer memory, a frame assembler and a read-out unit. It is identical in terms of other components and functions.

(a-4) LAN interface

The LAN interface 50 includes the data receiver 51 for receiving frames from the LAN, the data transmitter 52 for transmitting frames to the LAN, the first converter (frame→cell converter) 53 for converting a frame to ATM cells and attaching a VPI/VCI conforming to the destination, the second converter (cell→frame converter) 54 for converting ATM cells to a frame, the ATM interface 55 and the control unit 56. The second converter 54 has an internal buffer. The maximum allowable band Fmax of the LAN interface 50 is decided by the size and conversion speed of this buffer and the frame transmission speed.

The ATM interface 55 has a routing table (not shown). When an ATM cell enters, the ATM interface 55 replaces the VCI of the ATM cell and attaches routing information on the basis of the routing table and then sends the VCI cell to the ATM switch 60. Further, the ATM interface 55 removes routing information attached to an ATM cell which has entered from the ATM switch 60 and then inputs this ATM cell to the cell→frame converter 54.

(b) First embodiment of processing for communication between ATM-UNI and LAN

Figure 6:
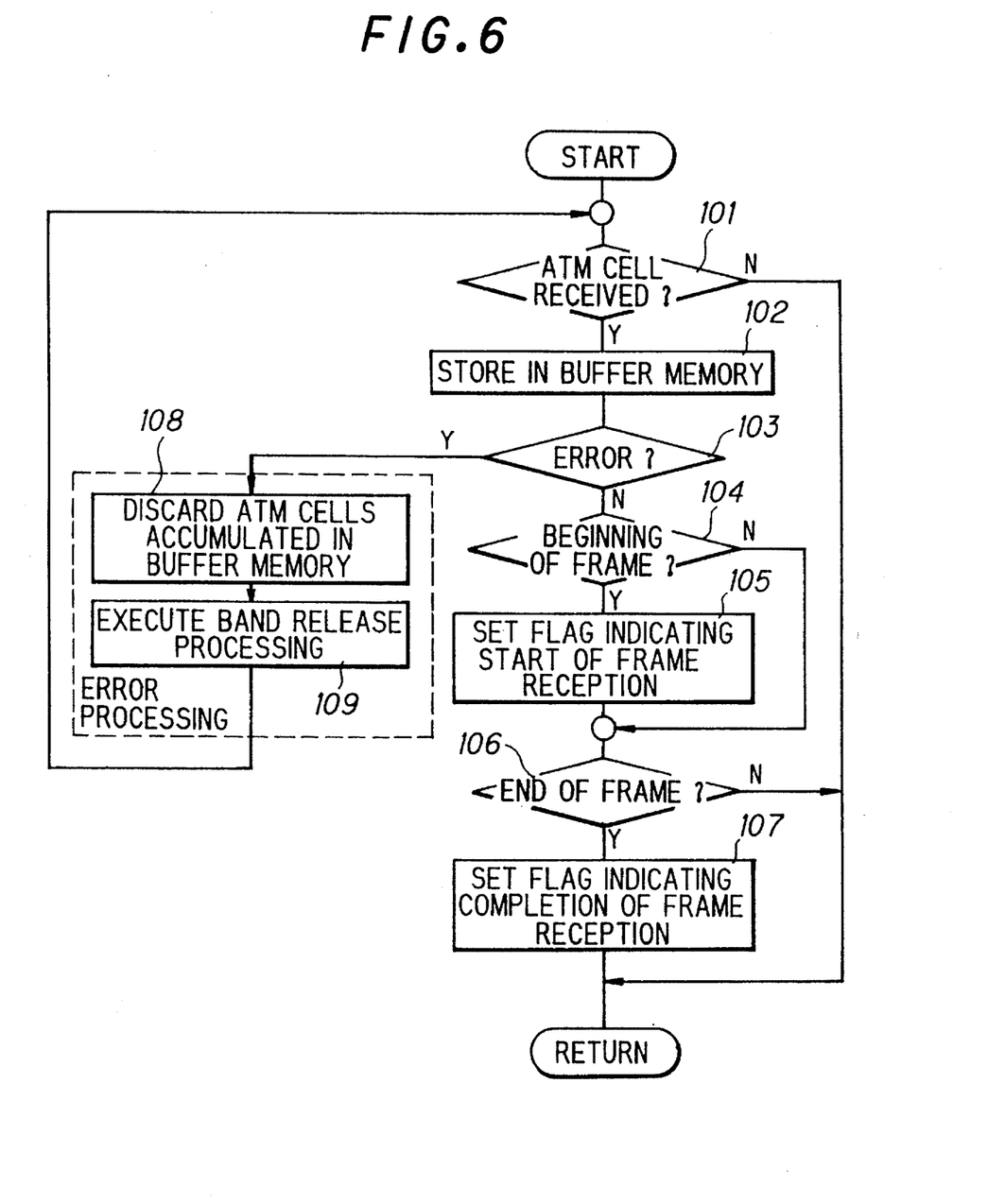
FIG. 6 is a flowchart of processing for receiving an ATM cell according to a first embodiment.
Figure 7:
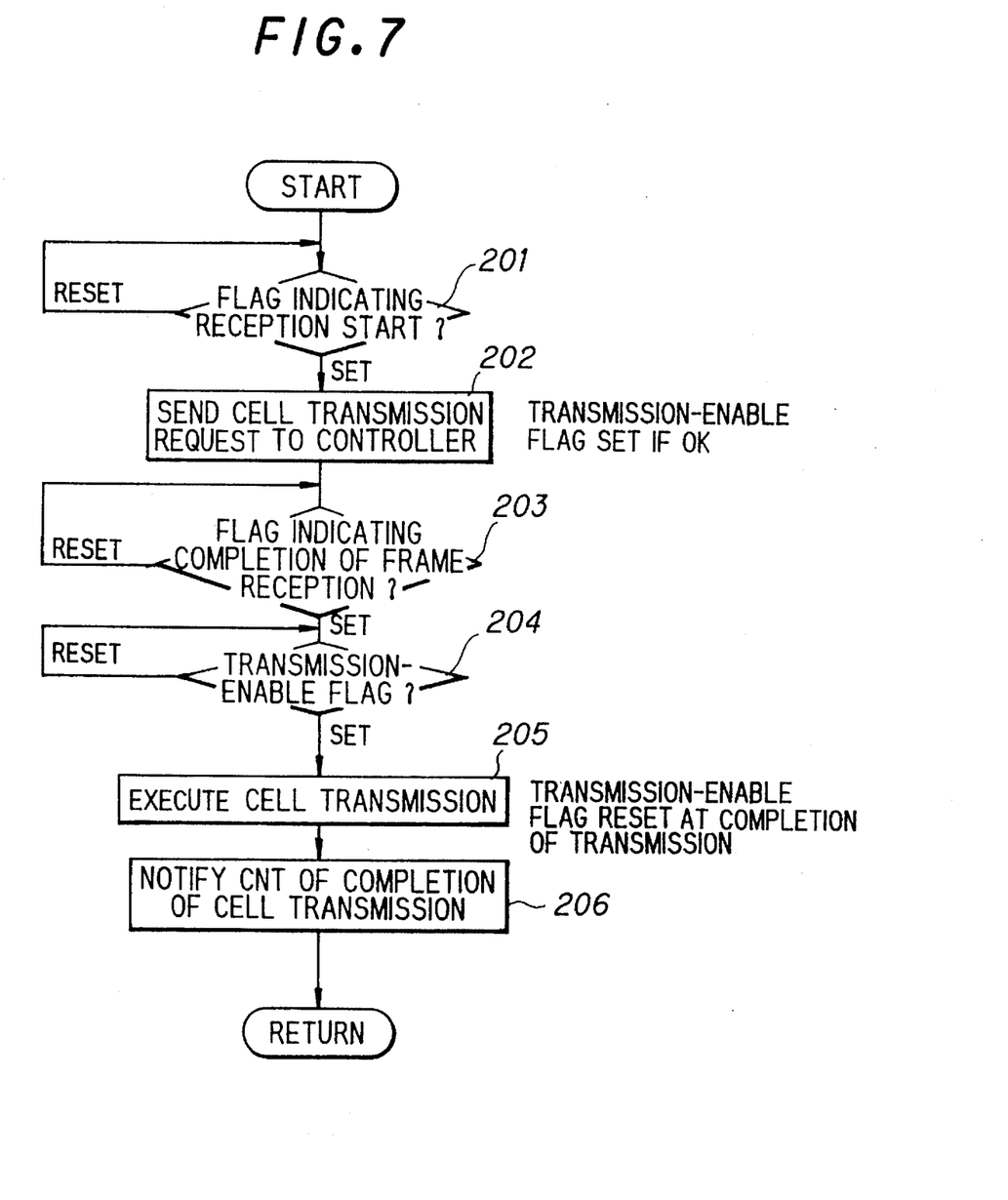
FIG. 7 is a flowchart of processing for transmitting an ATM cell.
Figure 8:
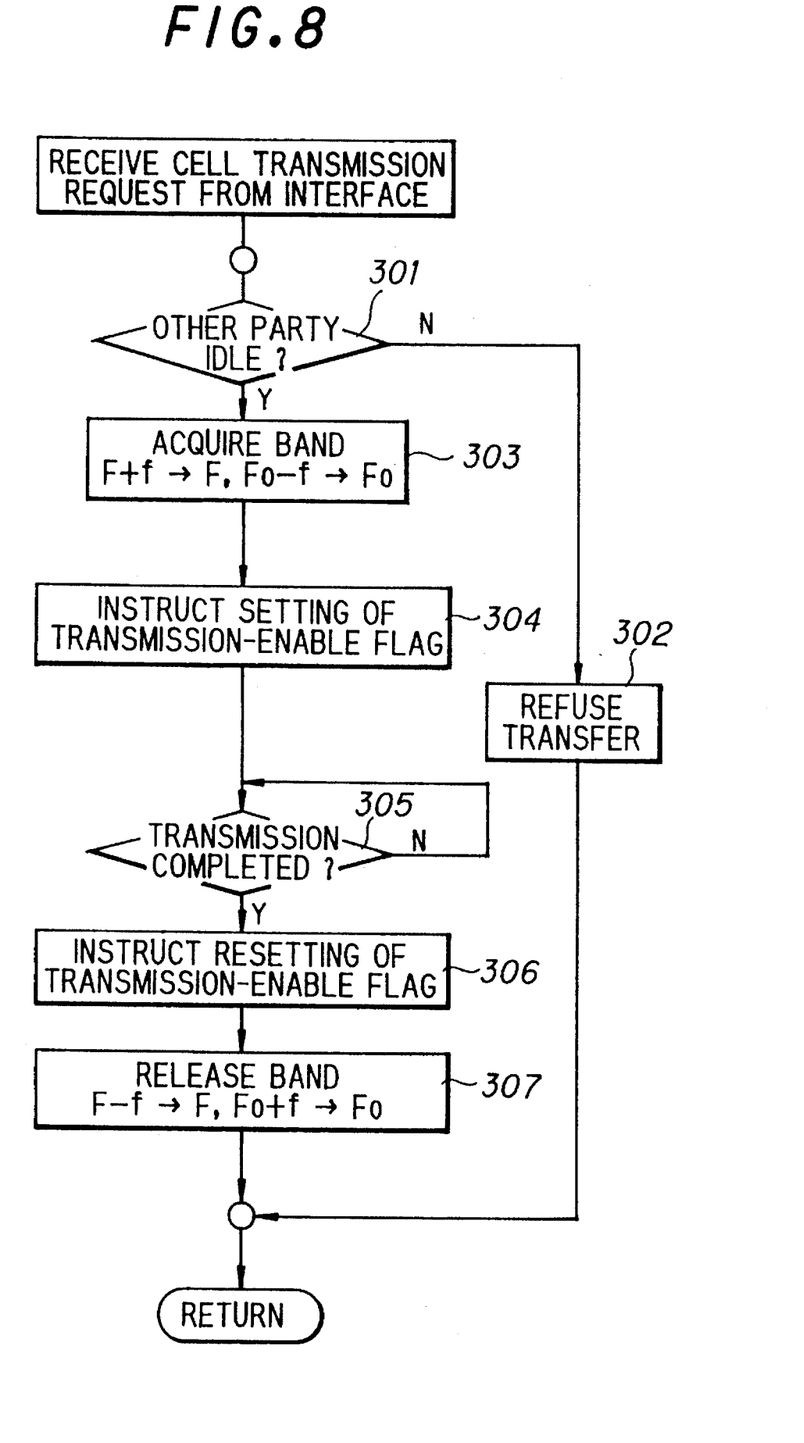
FIG. 8 is a flowchart of processing for band acquisition and release according to the first embodiment.
Figure 9:
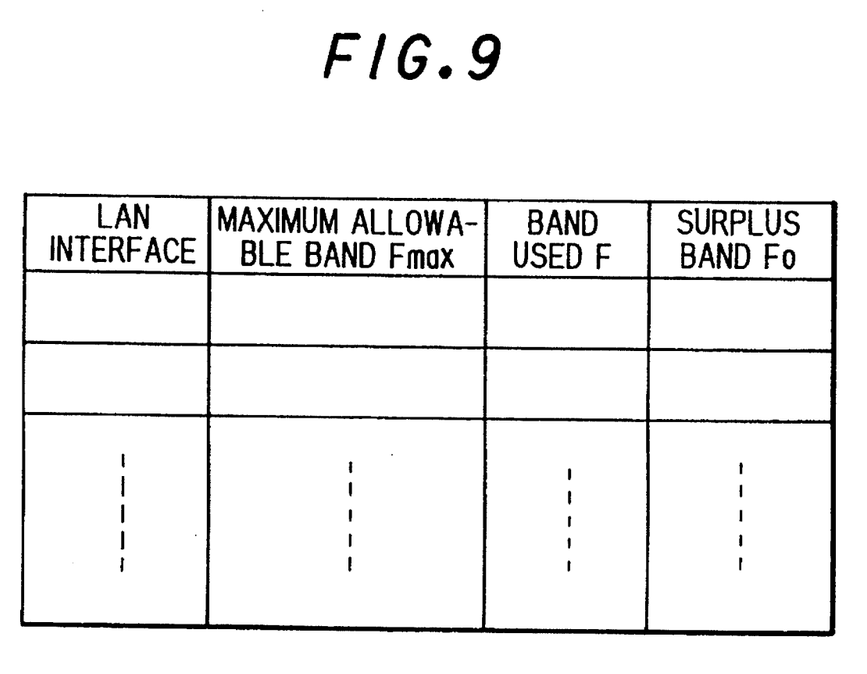
FIG. 9 is a diagram for describing for describing a band management table.

FIGS. 6–8 are flowcharts of communication processing for communication from the ATM-UNI interface 40 to the LAN interface 50. This is for a case in which the status of vacancy of the other party's LAN interface is referred to when the beginning of a frame is detected on the basis of an ATM cell which has arrived. FIG. 6 is a flowchart of ATM-cell reception processing by the ATM-UNI interface 40, FIG. 7 a flowchart of ATM-cell transmission processing by the ATM-UNI interface 40, and FIG. 8 is a flowchart of processing for band acquisition and release of the LAN interface.

(b-1) ATM-cell reception processing (FIG. 6)

Upon receiving an ATM cell to which a VCI for data has been attached, the data receiver 41 inputs this ATM cell to the buffer memory 43 and frame assembler 44 (step 101). (It is assumed that a signal cell has already been received.)

The buffer memory 43 stores the ATM cell and the frame assembler 44 assembles a frame (step 102).

Next, the control unit 47 determines whether an error has occurred (step 103) and, if the answer is "NO", determines whether the cell is the beginning of a frame (step 104). If it is the beginning of a frame, then the control unit 47 sets a frame reception-start flag, which has been stored in an internal register or memory, to "1" (step 105). When this flag has been set, acquisition of a band is carried out by band acquisition/release processing (FIG. 8), described later.

After this flag has been set, or in a case where a "NO" decision has been rendered at step 104, the control unit 47 determines whether the end of the frame has been detected (step 106). If the end of the frame has not been detected, the program returns to the beginning, reception of the next data cell is awaited and the foregoing processing is repeated.

If the end of the frame has been detected, the control unit 47 sets a frame reception-completion flag in the register or memory (step 107). The program then returns and reception of the data cell of the next frame is awaited.

If it is found at step 103 that an error has occurred, e.g., when ATM cells stop arriving in the course of a frame, the ATM cells that have been accumulated in the buffer memory 43 up to this point in time are discarded and the controller 70 is notified of the fact that an error has occurred. In response, the controller 70 notifies the LAN interface 50 of the other party of the fact that communication has ended (step 108). As the result of this processing, the ATM exchange 30 can be prevented from behaving abnormally owing to the occurrence of an error. The controller 70 then releases the band acquired by the LAN interface 50. More specifically, the band used is updated by the operation F-f→F (step 109), where the band used by the LAN 50 is represented by F and the band necessary for transmission of an interrupted frame is represented by f. The reason for releasing the band is that the band has already been acquired at the beginning of the frame.

Other examples of errors besides that mentioned above are cell omission, failure to detect start of an ATM cell, failure to detect end of an ATM cell, etc.

(b-2) ATM-cell transmission processing (FIG. 7)

In concurrence with ATM-cell reception processing, the controller 47 performs monitoring to determine whether the frame reception-start flag has been set (step 201). If the frame reception-start flag has been set, the control unit 47 issues a cell transmission request to the controller 70 (step 202). In response, the controller 70 starts the band acquisition/release processing of FIG. 8.

Next, the control unit 47 determines whether the frame reception-completion flag has been set (step 203). If the flag has not been set, the system waits for it to be set. If the flag has been set (step 107 in FIG. 6), the control unit 47 determines whether a transmission-enable flag has been set. If this flag has not been set, the system waits for it to be set. It should be noted that the transmission-enable flag is set, in the band acquisition/release processing (FIG. 8), in a case where it is possible for the LAN interface 50 of the other party to transmit a frame which is new in terms of band.

If it is possible for the LAN interface 50 of the other party to transmit a frame of interest and the transmit-enable flag has been set, the control unit 47 controls the read-out unit 45 so that one frame of ATM cells accumulated in the buffer memory 43 is read out. This frame is transferred to the other party's LAN interface 50 via the ATM interface 46 and ATM switch 60 (step 205).

The ATM interface 55 of the LAN interface 50 removes the routing information from the ATM cell, which has entered from the ATM switch 60, and inputs this cell to the second converter (cell→frame converter) 54. The second converter 54 converts the ATM cells into a frame and inputs the frame to the data transmitter 52 via the internal buffer. The frame is then transmitted to the LAN terminal. The control unit 56 monitors completion of frame transmission and notifies the controller 70 of the completion of transmission (step 206).

(b-3) Band acquisition/release processing (FIG. 8)

When a cell transmission request enters from the control unit 47 of the ATM-UNI interface 40 at step 202 in ATM-cell transmission processing, the controller 70 checks the status of vacancy of the other party's LAN interface 50 (step 301). It should be noted that the controller 70 possesses a band management table for managing the maximum allowable band Fmax, the band F used at the present time and a surplus band $F_0$ (=Fmax−F) of all LAN interfaces accommodated by the ATM exchange 30.

The processing for checking status of vacancy will now be described in detail. Since the cell transmission request includes the band f necessary for transmitting a frame (namely the maximum cell speed of which notification has been given by the signal cell from the ATM terminal 21a at the time of the outgoing call), the controller 70 compares the magnitudes of the necessary band f and surplus band $F_0$. If f>$F_0$ holds, transmission of the frame is refused and the ATM terminal 21a is so notified via the ATM-UNI interface 40 (step 302). It can be so arranged that the system will wait for a band to become vacant.

If f<$F_0$ is found to hold, then the necessary band f is acquired and both the frequency F being used and the surplus band $F_0$ are updated as follows:

$$F+f \rightarrow F, \quad F_0-f \rightarrow F_0$$

(step 303). Next, the control unit 47 is instructed to set the transmission-enable flag (step 304). If the transmission-enable flag is set by the foregoing operation, then processing for transmitting one frame of ATM cells (which have been stored in the buffer memory 43) is started at step 205 in FIG. 7.

After the setting of the transmission-enable flag has been instructed, the controller 70 waits for notification, from the control unit 56 of the LAN interface 50, of the completion of frame transfer (step 305). In response to completion of transmission, the controller 70 instructs the control unit 47 to reset the transmission-enable flag (step 306). Next, the controller 70 updates the frequency F being used and the surplus band $F_0$ as follows:

$$F-f \rightarrow F, \quad F_0+f \rightarrow F_0$$

(step 307). The program then returns and the system waits for the next cell-transmission request.

Thus, it is so arranged that the controller 70 updates the band used by the LAN interface and the surplus band whenever frame transmission starts and ends and allocates a band for every frame. As a result, the band of the LAN can be utilized efficiently and both waiting time and the occurrence of transmission refusal can be reduced.

Further, after arrival of the ATM cell which indicates the beginning of a frame, reference is had to the status of vacancy of the LAN interface corresponding to the other party. In dependence upon the status of vacancy, the ATM cells that have been stored in the buffer memory are transmitted after reception of the frame is completed. As a result, time for investigating the status of vacancy of the LAN interface can be eliminated and it is possible to suppress data transmission delay.

As set forth above, it is so arranged that a band is acquired when the beginning of a frame has been detected. However, it can be so arranged that a band is acquired when the end of a frame has been detected.

(c) Second embodiment of processing for communication between ATM-UNI and LAN

Figure 10:
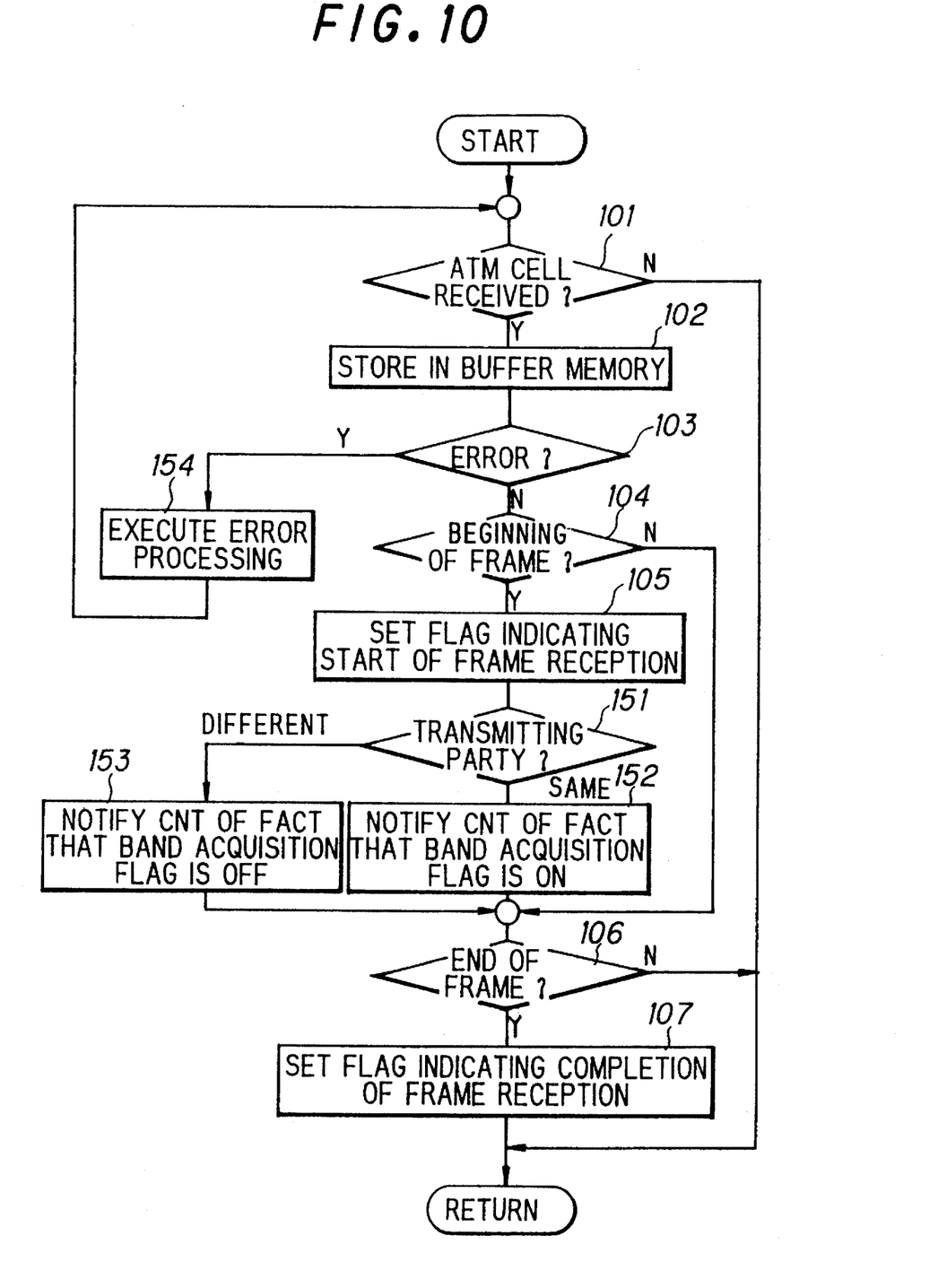
FIG. 10 is a flowchart of processing for receiving an ATM cell according to a second embodiment.
Figure 11:
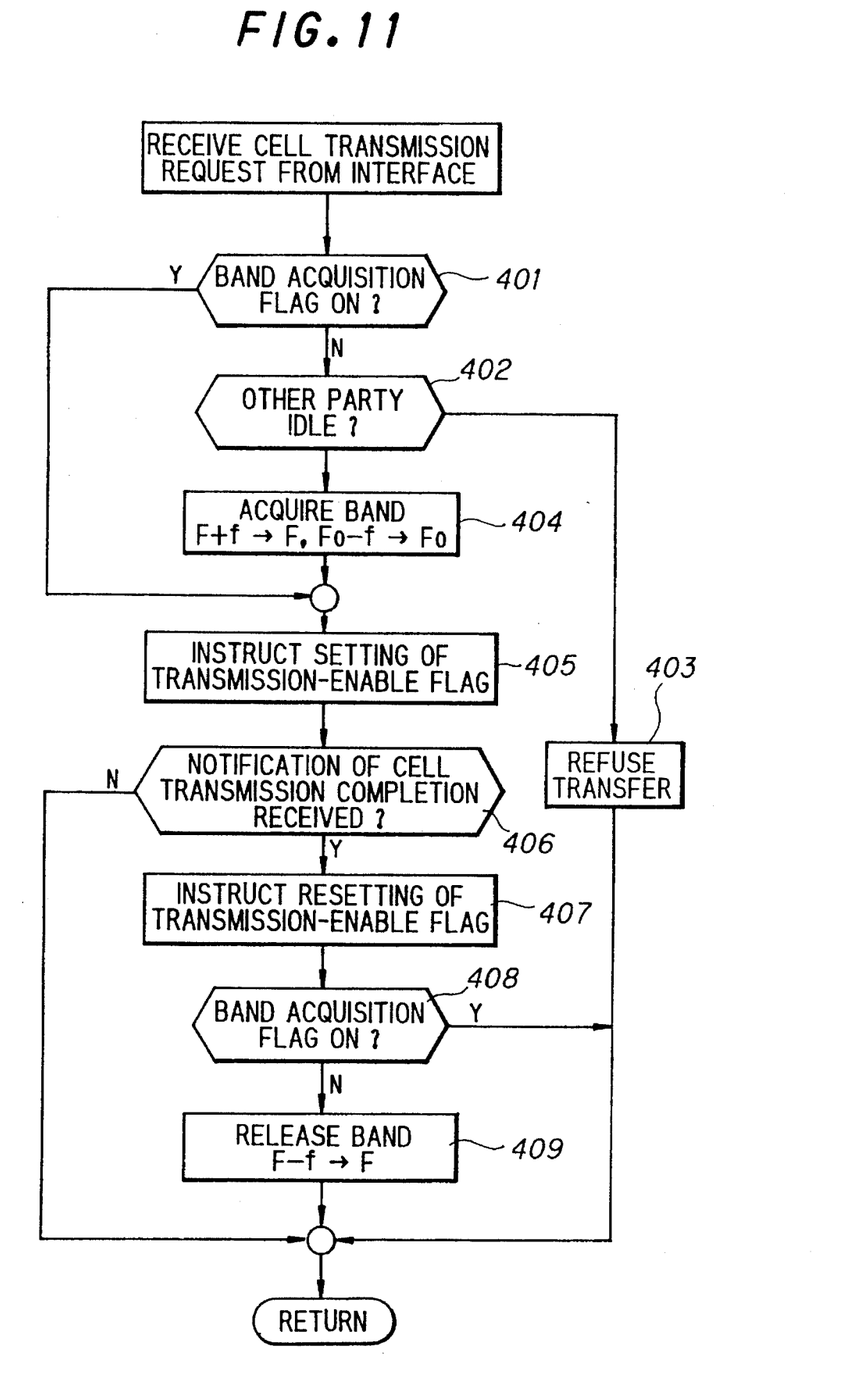
FIG. 11 is a flowchart of processing for band acquisition and release according to the second embodiment.

FIGS. 10 and 11 are flowcharts of communication processing for communication from the ATM-UNI interface 40 to the LAN interface 50 in accordance with a second embodiment of the invention. FIG. 10 is a flowchart of ATM-cell reception processing by the ATM-UNI interface 40, and FIG. 11 a flowchart of processing for band acquisition and release of the LAN interface. The flow of processing for ATM-cell reception is the same as that of FIG. 7.

In the second embodiment, a band continues to be acquired in a case where the next ATM cell for the same destination arrives before the transmission of one frame of ATM cells from the LAN interface 50 is completed. Further, time up to arrival of the next ATM cell for the same destination is managed by a timer and it is possible to continue to acquire a band until time out.

(c-1) ATM-cell reception processing (FIG. 10)

The data receiver 41 performs monitoring to determine whether an ATM cell to which a VCI for data has been attached has arrived (step 101).

Upon receiving an ATM cell to which a VCI for data has been attached, the data receiver 41 inputs this ATM cell to the buffer memory 43 and frame assembler 44. The buffer memory 43 stores a data cell and the frame assembler 44 assembles a frame (step 102).

Next, the control unit 47 determines whether an error has occurred (step 103) and, if the answer is "NO", determines whether the cell is the beginning of a frame (step 104). If it is the beginning of a frame, then the control unit 47 sets a frame reception-start flag, which has been stored in an internal register or memory, to "1" (step 105).

Next, the control unit 47 (1) determines whether the LAN interface of the present frame transmitting party is the same at the preceding LAN interface and (2) makes an inquiry of the control unit 70 as to whether transmission of the preceding frame from the LAN interface is still incomplete (step 151). If the LAN interface is the same and transmission has not yet been completed, then the controller 70 is notified of the fact that a band acquisition flag is ON (step 152).

If the LAN interface is different or if the transmission has been completed, then the controller 70 is notified of the fact that the band acquisition flag is OFF (step 153).

After step 152 or 153, or if a "NO" decision is rendered at step 104, the control unit 47 determines whether the end of the frame has been detected (step 106). If the end of the frame has not been detected, the program returns to the beginning, reception of the next data cell is awaited and the foregoing processing is repeated. However, if the end of the frame has been detected, the control unit 47 sets a frame reception-completion flag in the register or memory (step 107). The program then returns and reception of the data cell of the next frame is awaited.

If it is found at step 103 that an error has occurred, error processing at step 108, 109 in FIG. 6 is executed (step 154).

It should be noted that the ATM-cell transmission processing shown in FIG. 7 is executed in concurrence with the above-mentioned ATM-cell reception processing.

(c-3) Band acquisition/release processing (FIG. 11)

When a cell transmission request enters from the control unit 47 of the ATM-UNI interface 40 at step 202 (FIG. 7) in ATM-cell transmission processing, the controller 70 checks to determine whether the band acquisition flag is ON (step 401). If the acquisition flag is not ON, then the controller 70 checks the status of vacancy of the other party's LAN interface 50 (step 402). That is, the controller 70 compares the size of the band f, which is necessary for transmission of the frame, with the side of the surplus band $F_0$. If $f > F_0$ holds, transmission of the frame is refused and the ATM terminal 21a is so notified via the ATM-UNI interface 40 (step 403).

If $f < F_0$ is found to hold, then the necessary band f is acquired and both the frequency F being used and the surplus band $F_0$ are updated as follows:

$$F+f \rightarrow F, F_0-f \rightarrow F_0$$

(step 404). Next, or if the band acquisition flag is ON, the control unit 47 is instructed to set the transmission-enable flag (step 405). If the transmission-enable flag is set, then processing for transmitting one frame of ATM cells (which have been stored in the buffer memory 43) is started at step 205 in FIG. 7.

After the setting of the transmission-enable flag has been instructed, the controller 70 waits for notification, from the control unit 56 of the LAN interface 50, of the completion of frame transfer (step 406). In response to completion of transmission, the controller 70 instructs the control unit 47 to reset the transmission-enable flag (step 407).

Next, it is determined whether the band acquisition flag is ON (step 408). If the flag is ON, then the program returns and the system waits for the next cell transmission request without releasing the band. If the band acquisition flag is OFF, however, the controller 70 updates the frequency F being used and the surplus band $F_0$ as follows:

$$F-f \rightarrow F, F_0+f \rightarrow F_0$$

(step 409). The program then returns and the system waits for the next cell-transmission request.

Thus, in a case where the next ATM cell for the same destination has arrived before completion of transmission of one frame of ATM cells, a band continues to be acquired and transmitted. This makes it possible to raise communication efficiency.

(d) Alternative construction of ATM exchange

Figure 12:
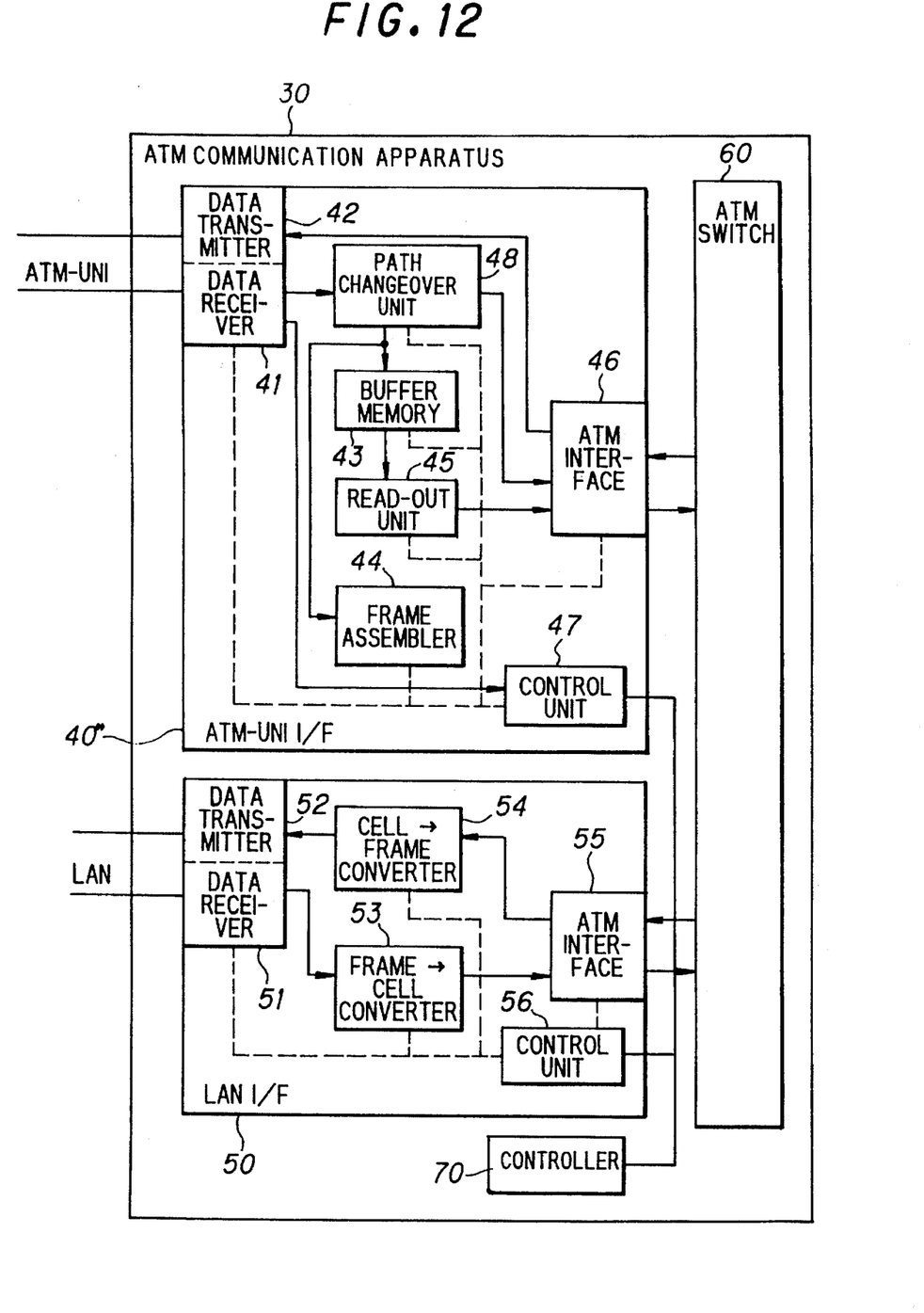
FIG. 12 is a diagram showing an alternative construction of an ATM exchange.
Figure 13A:
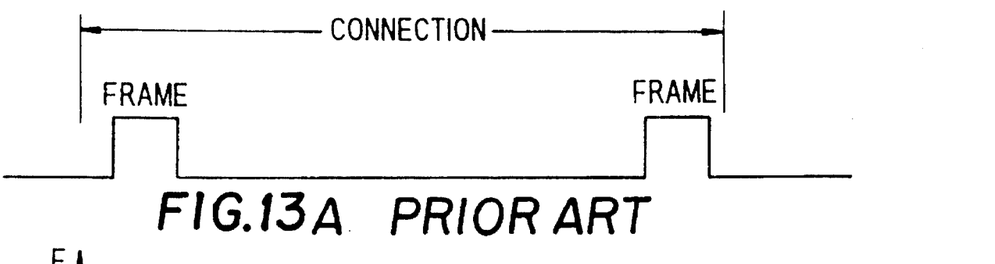
FIG. 13 is a diagram for describing problems encountered in the prior art.
Figures 13B, 13C:
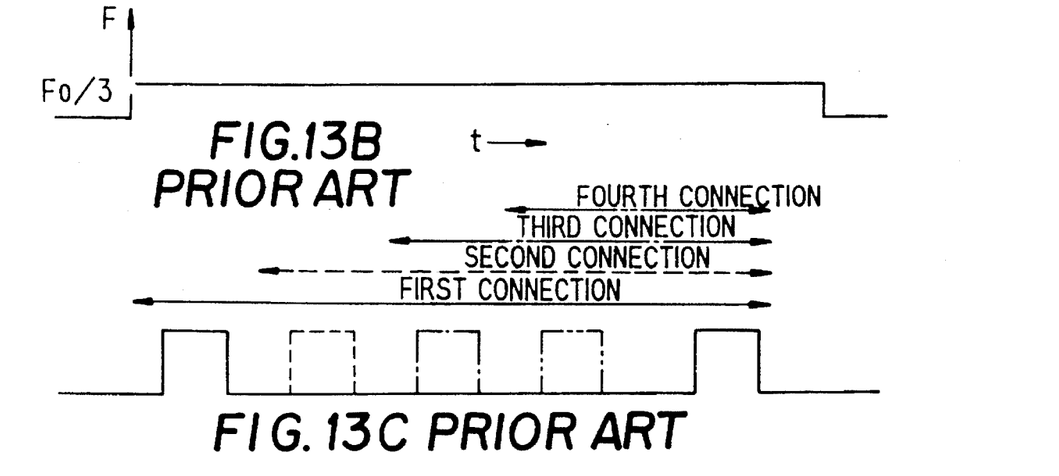
Figure 13D:
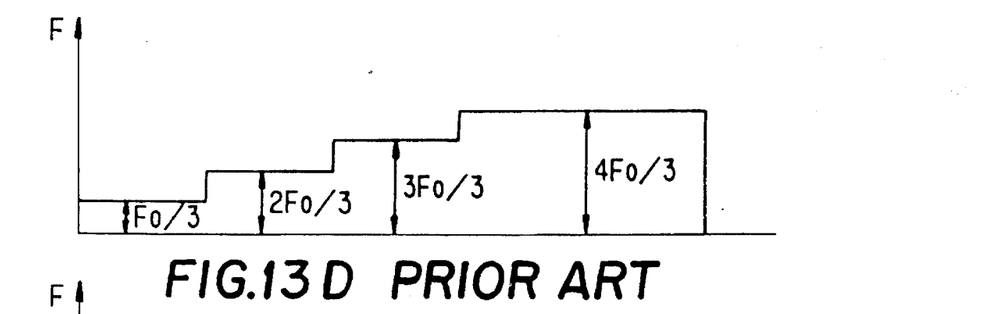
Figure 13E:
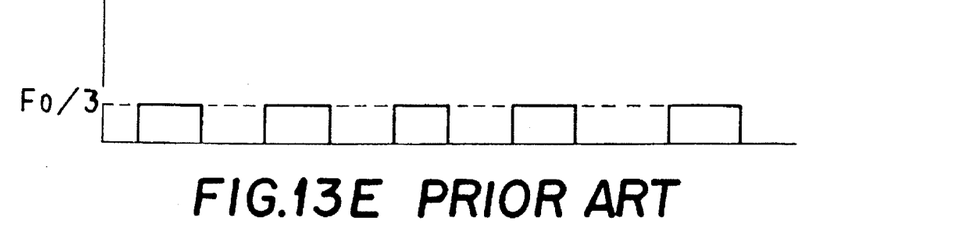

FIG. 12 is a diagram showing the construction of another embodiment of the ATM exchange 30. In FIG. 3, two types of interfaces are provided as ATM-UNI interfaces, namely (1) the interface 40 for the LAN and (2) the interface 40' for the ATM-UNI. In FIG. 12, one interface serves both purposes.

Specifically, as shown in FIG. 12, numeral 30 denotes the ATM exchange having an ATM-UNI interface 40" for both a LAN and an ATM-UNI, the LAN interface 50, the ATM switch 60 and the controller (CNT) 70 for controlling the overall ATM communication apparatus. The ATM-UNI interface 40" has a construction substantially the same as that of the interface 40 for the LAN in FIG. 3; the only difference is the provision of a path changeover unit 48.

On the basis of the terminating number or other information, the control unit 47 determines whether the communicating party is a LAN terminal or an ATM terminal. If the communicating party is a LAN terminal, the control unit 47 controls the path changeover unit 48 to input an ATM cell (data cell) to the buffer memory 43 and frame assembler 44. If the communicating party is an ATM terminal, on the other hand, the control unit 47 controls the path changeover unit 48 to input the ATM cell directly to the ATM interface 46.

In accordance with this arrangement, separate interfaces need not be provided for a LAN and for an ATM-UNI. Further, in the arrangement of FIG. 3, the ATM terminal accommodated by the interface for the ATM-UNI cannot transmit data to a LAN terminal. With the arrangement of FIG. 12, however, the ATM terminal can transmit data to both LAN and ATM terminals.

Thus, in accordance with the present invention as described above, the band used by the LAN interface and the surplus band can be updated whenever frame transfer begins and ends and. Moreover, bands can be allocated frame by frame. As a result, the band of a LAN interface can be used efficiently and it is also possible to reduce waiting time and occurrence of transmission refusal.

Further, after arrival of the ATM cell which indicates the beginning of a frame, reference is had to the status of vacancy of the LAN interface corresponding to the other party. In dependence upon the status of vacancy, the ATM cells that have been stored in the buffer memory are transmitted after reception of the frame is completed. As a result, time for investigating the status of vacancy of the LAN interface can be eliminated and it is possible to suppress data transmission delay.

Further, in a case where the next ATM cell for the same destination has arrived before completion of transmission of one frame of ATM cells, a band continues to be acquired and transmitted. This makes it possible to raise communication efficiency.

As many apparently widely different embodiments of the present invention can be made without departing from the spirit and scope thereof, it is to be understood that the invention is not limited to the specific embodiments thereof except as defined in the appended claims.

What is claimed is:

1. A method of communicating between an ATM-UNI and a LAN in a communication apparatus having an ATM-UNI interface and a LAN interface for performing communication between these interfaces via an ATM switch, the method comprising the steps of:

receiving, in an ATM-cell format, transmission data from a terminal connected to the ATM-UNI interface;

accumulating the ATM cells in a buffer memory provided in the ATM-UNI interface and assembling the ATM cells into a frame;

recognizing completion of reception of all ATM cells of one frame;

determining whether there is margin for a transmission by referring to status of vacancy of the LAN interface;

transferring one frame of the ATM cells accumulated in the buffer memory to the LAN interface via the ATM switch in a case where there is margin for transmission; and converting the ATM cells into a frame at said LAN interface and sending the frame to a LAN terminal.

2. The method according to claim 1, wherein after reception of an ATM cell which indicates the beginning of a frame, reference is made to the status of vacancy of the LAN interface and, in dependence upon the status of vacancy, transmission of the ATM cells that have been stored in said buffer memory is allowed or forbidden.

3. The method according to claim 1, further comprising the steps of:

discarding, when ATM cells have not been received in the course of a frame, the ATM cells that have been accumulated in the buffer memory up to this point in time, and suspending communication.

4. A method of communicating between an ATM-UNI and a LAN in a communication apparatus having an ATM-UNI interface and a LAN interface for performing communication between these interfaces via an ATM switch, the method comprising the steps of:

receiving, in an ATM-cell format, transmission data from a terminal connected to the ATM-UNI interface;

accumulating the ATM cells in a buffer memory provided in the ATM-UNI interface and assembling the ATM cells into a frame;

recognizing completion of reception of all ATM cells of one frame;

determining whether vacancy of a band f, which is required for transfer of the frame accumulated in said buffer memory, exists in the LAN interface;

if vacancy exists, increasing the band used by f or decreasing a surplus band by f and transferring one frame of ATM cells, which have been accumulated in said buffer memory, to the LAN interface via the ATM switch;

converting the ATM cells to a frame in the LAN interface and transmitting the frame to a LAN terminal; and decreasing the band used by f or increasing the surplus band by f in response to completion of transfer of said frame.

5. The method according to claim 4, further comprising the step of performing monitoring to determine whether the next ATM cell for an identical destination has been received before completion of transmission of one frame of ATM cells stored in the buffer memory, and continuing to acquire a band in a case where the next ATM cell for the identical destination has been received.

6. The method according to claim 4, whereinafter reception of an ATM cell which indicates the beginning of a frame, reference is had to the status of vacancy of the LAN interface and, in dependence upon the status of vacancy, transmission of the ATM cells that have been stored in said buffer memory is allowed or forbidden.

7. A communication apparatus having an ATM-UNI interface and a LAN interface for performing communication between these interfaces via an ATM switch, comprising:

receiving means for receiving, in an ATM-cell format, transmission data from a terminal connected to the ATM-UNI interface;

a buffer memory provided in the ATM-UNI interface for accumulating the ATM cells that have been received;

frame assembling means for assembling the received ATM cells into a frame;

means for recognizing completion of reception of all ATM cells of one frame by detecting end of the frame;

means for determining whether there is margin for a transmission by referring to a status of vacancy of the LAN interface, and transferring the ATM cells accumulated in the buffer memory to said LAN interface upon completion of transmission of one frame of the ATM cells in a case where there is margin for transmission; and means provided in the LAN interface for converting the ATM cells into a frame and sending the frame to a LAN terminal.

8. A communication apparatus having an ATM-UNI interface and a LAN interface for performing communication between these interfaces via an ATM switch, comprising:

receiving means for receiving, in an ATM-cell format, transmission data from a terminal connected to the ATM-UNI interface;

a buffer memory provided in the ATM-UNI interface for accumulating the ATM cells that have been received;

frame assembling means for assembling the received ATM cells into a frame;

means for recognizing completion of reception of all ATM cells of one frame;

means for determining whether vacancy of a band f, which is required for transfer of the frame accumulated in said buffer memory, exists in the LAN interface and, if vacancy exists, increasing the band used by f or decreasing a surplus band by f, transferring one frame of ATM cells, which have been accumulated in said buffer memory, to the LAN interface via the ATM switch, and decreasing the band used by f or increasing the surplus band by f in response to completion of transmission of said frame to the LAN terminal.

9. The apparatus according to claim 8, further comprising:

means for performing monitoring to determine whether the next ATM cell for an identical destination has been received before completion of transmission of one frame of ATM cells stored in the buffer memory; and means for continuing to acquire a band in a case where the next ATM cell for the identical destination has been received.

10. A method of communicating between an ATM-UNI and a LAN in a communication apparatus having ATM-UNI interfaces and a LAN interface for performing communication between said interfaces via an ATM switch, the method comprising the steps of:

receiving, in an ATM-cell format, transmission data from a terminal connected to one of the ATM-UNI interfaces;

identifying whether a terminating party is a LAN terminal or an ATM-UNI terminal;

(a) in a case where the terminating party is a LAN terminal, accumulating ATM cells in a buffer memory provided in each ATM-UNI interface and assembling the ATM cells into a frame;

recognizing completion of reception of all ATM cells of one frame;

determining whether there is margin for a transmission by referring to a status of vacancy of the LAN interface corresponding to the terminating party;

transferring one frame of the ATM cells accumulated in the buffer memory to the LAN interface corresponding to the terminating party via the ATM switch when there is margin for transmission;

converting the ATM cells into a frame at said LAN interface and sending the frame to the terminating terminal;

(b) in a case where the terminating party is an ATM-UNI terminal, transferring the ATM cells to another ATM-UNI interface corresponding to the terminating party via the ATM switch without accumulating the ATM cells in the buffer memory; and sending the ATM cells to the terminating party from another ATM-UNI interface.

11. An ATM-UNI interface disposed in a communication apparatus with a LAN interface for performing communication therebetween via an ATM switch, comprising:

receiving means for receiving, in an ATM-cell format, transmission data from a terminal;

a buffer memory for accumulating ATM cells which have been received;

frame assembling means for assembling the received ATM cells into a frame;

means for recognizing completion of reception of all ATM cells of one frame by detecting an end of the frame; and means for determining whether there is margin for a transmission by referring to a status of vacancy of the LAN interface, and transferring the ATM cells accumulated in the buffer memory to said LAN interface upon completion of transmission of one frame of the ATM cells in a case where there is margin for transmission.

12. An ATM-UNI interface disposed in a communication apparatus with a LAN interface for performing communication therebetween via an ATM switch, comprising:

receiving means for receiving, in an ATM-cell format, transmission data from a terminal;

a buffer memory for accumulating ATM cells which have been received;

frame assembling means for assembling the received ATM cells into a frame;

means for recognizing completion of reception of all ATM cells of one frame by detecting an end of the frame; and means for determining whether vacancy of a band f, which is required for transfer of the frame accumulated in said buffer memory, exists in the LAN interface and, if vacancy exists, increasing the band used by f or decreasing a surplus band by f, transferring one frame of ATM cells, which have been accumulated in said buffer memory, to the LAN interface via the ATM switch, and decreasing the band used by f or increasing the surplus band by f in response to completion of transmission of said frame to the LAN terminal.

* * * * *